United States Patent [19]

Barr

[11] Patent Number: 5,101,691
[45] Date of Patent: Apr. 7, 1992

[54] METHODS OF MANUFACTURING CUTTER ASSEMBLIES FOR ROTARY DRILL BITS

[75] Inventor: John D. Barr, Cheltenham, England

[73] Assignee: Reed Tool Company Limited, Gloucestershire, England

[21] Appl. No.: 480,607

[22] Filed: Feb. 14, 1990

[30] Foreign Application Priority Data

Feb. 16, 1989 [GB] United Kingdom ............ 8903542-2

[51] Int. Cl.5 .................... E21B 10/56; B21K 5/02
[52] U.S. Cl. ...................... 76/108.2; 76/DIG. 11; 76/DIG. 12
[58] Field of Search .............. 76/108.1, 108.2, 108.4, 76/DIG. 11, DIG. 12; 175/327, 329, 409, 410, 411

[56] References Cited

U.S. PATENT DOCUMENTS 4,705,122 11/1987 Wardley et al. ............... 76/108.2
4,919,220 4/1990 Fuller et al. ................... 76/108.2
4,947,945 8/1990 Griffin ........................... 76/108.2
4,956,238 9/1990 Griffin ........................... 76/108.2

FOREIGN PATENT DOCUMENTS 0211642 5/1981 European Pat. Off. .
0295151 6/1988 European Pat. Off. .
0040846 5/1981 European Pat. Off. .

Primary Examiner—Roscoe V. Parker
Attorney, Agent, or Firm—Browning, Bushman, Anderson & Brookhart

[57] ABSTRACT

A method of manufacturing a cutter assembly for a rotary drill bit includes the step of bonding to a carrier a cutting element which comprises a thin hard facing layer already bonded to a less hard backing layer, the backing layer having a greater coefficient of thermal expansion than the hard facing layer. In order to compensate for convex deformation of the rear surface of the backing layer, when the cutting element is heated during the bonding process, the rear surface is made initially concave at ambient temperature. Alternatively, or additionally, the co-operating surface of the carrier may be concave.

12 Claims, 2 Drawing Sheets

METHODS OF MANUFACTURING CUTTER ASSEMBLIES FOR ROTARY DRILL BITS

BACKGROUND OF THE INVENTION

The invention relates to rotary drill bits for use in drilling or coring holes in subsurface formations, and particularly to the manufacture of cutter assemblies for use in such drill bits.

Rotary drill bits of the kind to which the present invention is applicable comprise a bit body having a shank for connection to a drill string and a passage for supplying drilling fluid to the face of the bit, which carries a plurality of cutting elements. The cutting elements are so called "preform" cutters comprising a tablet, often circular or part-circular, made out of a thin hard facing layer, usually polycrystalline diamond, bonded to a less hard backing layer, usually cemented tungsten carbide.

Usually the bit body is machined from solid metal, usually steel, or is moulded using a powder metallurgy process in which tungsten carbide powder is infiltrated with metal alloy binder in a furnace so as to form a hard matrix.

In a steel-bodied bit, and also in some matrix-bodied bits, each cutting element is normally mounted on a carrier, such as a stud or post, and the stud or post is then secured within a socket in the bit body. Usually the rear surface of the backing layer is bonded to a surface of the carrier by brazing, although it has also been proposed that other bonding methods may be used, and in particular diffusion bonding.

In conventional two-layer cutting elements the rear surface of the backing layer is substantially flat and is bonded to a corresponding flat surface on the carrier. However, the less hard backing layer normally has a greater coefficient of thermal expansion than the hard facing layer of the cutting element and consequently when the element is heated to the temperature necessary to effect brazing or diffusion bonding there is a differential expansion which causes the cutting element to become dished, with the result that the rear surface of the backing layer is convexly deformed. Very high pressure requires to be imparted to the cutting element to flatten it against the flat surface of the carrier and this is difficult to achieve in practice. Consequently, the convex deformity of the rear surface of the backing layer has the result that the spacing between the rear surface and the surface of the carrier is not of constant thickness but is greater nearer the periphery of the cutting element and this may adversely affect the strength of the final bond.

The present invention sets out to provide methods for overcoming this problem.

SUMMARY OF THE INVENTION

According to a first aspect of the present invention, there is provided a method of manufacturing a cutter assembly for a rotary drill bit, including bonding to a carrier a cutting element which comprises a thin hard facing layer already bonded to a less hard backing layer, the backing layer having a greater coefficient of thermal expansion than the hard facing layer, the method including the step of providing the backing layer with a rear surface, for bonding to the carrier, which is concave at ambient temperature.

At the elevated temperature at which bonding is carried out, the concave rear surface will tend to flatten as a result of the differential expansion of the diamond layer and backing layer. That is to say, depending on the initial concavity it may become less concave, flat or slightly convex. The provision of an concavity in the rear surface of the backing layer is likely to provide some advantage, even in cases where the rear surface is still slightly concavely or convexly deformed at the bonding temperature, since in such cases the deformity may be less than it would be if the rear surface of the backing layer were initially flat. However, the initial concavity of the rear surface of the backing layer is preferably so selected that the rear surface becomes substantially flat at the elevated temperature at which it is bonded to the carrier.

When the cutter assembly is cooled after bonding it to the carrier, the cutting element will tend to try to return to its initial shape and this will have the effect of stressing the bond between the rear surface of the cutting element and the carrier. The peripheral edges of the bond will be in compression and this pre-stressed bond may be stronger than the conventional bond between surfaces which are flat at ambient temperature.

In a second aspect of the present invention, there is provided a method of manufacturing a cutter assembly for a rotary drill bit, including bonding to a carrier a cutting element which comprises a thin hard facing layer already bonded to a less hard backing layer, the backing layer having a greater coefficient of thermal expansion than the hard facing layer, the method including the step of providing the carrier with a concave surface, and bonding the rear surface of the backing layer of the cutting element to said concave surface of the carrier, whereby said concave surface at least partly accommodates any convex deformation of the rear surface of the backing layer at the elevated temperature at which bonding is carried out.

Thus, in this embodiment of the invention the cutting element may be of conventional form, having a flat rear surface, and the convex deformation of the rear surface is then accommodated partly or wholly by the concavity of the surface of the carrier.

Preferably the initial concavity of the surface of the carrier is selected so as substantially to match the convexity of the rear surface of the backing layer at the elevated temperature at which it is bonded to the carrier.

The methods according to the invention are particularly applicable to the case where the cutting element is diffusion bonded to the carrier, but advantage may also be given in cases where the cutting element is brazed or otherwise bonded to the carrier.

The two aspects of the invention may be combined, that is to say arrangements are possible in which both the rear surface of the backing layer of the cutting element and the surface on the carrier are concave at ambient temperature. In this case the concavity of each will require to be less than in the case where only one surface is initially concave.

The concavity may be effected by a grinding operation such as the operation commonly used in the art of grinding spherical lenses where a plurality of elements are ground simultaneously using a large part-spherical grinding head.

DETAILED DESCRIPTION OF THE PREFERRED EMBODIMENTS

Cutter assemblies to which the invention relates are for mounting in the body of a rotary drill bit of the kind first referred to. The bit body is formed over the surface thereof with a plurality of sockets and received in each socket is the stud portion of a cutter assembly. The cutter assembly is usually shrink-fitted or brazed into its socket. As previously mentioned, the cutter assemblies may be used with bits where the bit body is machined from metal, usually steel, or with matrix-bodied bits which are moulded using a powder metallurgy process, and in this case the sockets are initially moulded in the bit body. The construction of such bits is well known and will not be described in further detail.

Figure 1:
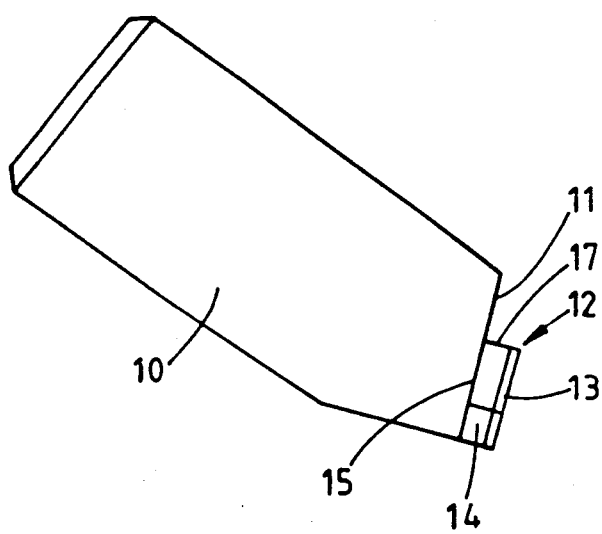
FIG. 1 is a side elevation of a cutter assembly manufactured according to the method of the present invention.
Figure 2:
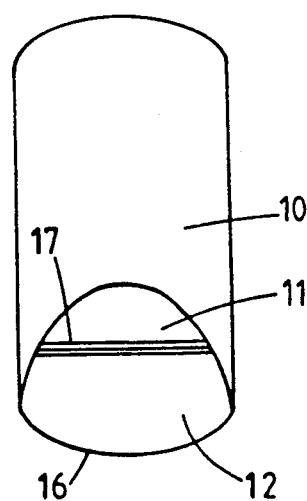
FIG. 2 is a front view of the assembly of FIG. 1.

Referring to FIGS. 1 and 2: the cutter assembly comprises a stud or post 10 formed from cemented tungsten carbide. The stud is generally cylindrical and circular in cross section and, in use, is received in a socket in the bit body.

The stud is formed at one end with a flat surface 11 which is inclined at an angle of less than 90° to the longitudinal central axis of the stud. A cutting element 12 is bonded to the surface 11 of the stud by diffusion bonding, brazing or other bonding method. The cutting element comprises a front hard facing layer 13 of polycrystalline diamond bonded to a thicker backing layer 14 of cemented tungsten carbide. The backing layer 14 has a rear surface 15 which is bonded to the surface 11 of the stud 10.

In the construction shown the cutting element 12 has a part-circular edge 16 opposite a straight edge 17. However, the invention is applicable to other shapes of cutting element and in particular to shapes of cutting element commonly used in the art, such as circular and part-circular cutting elements. Also the illustrated stud or post 10 is by way of example only and any other configuration of carrier may be employed.

Figure 3:
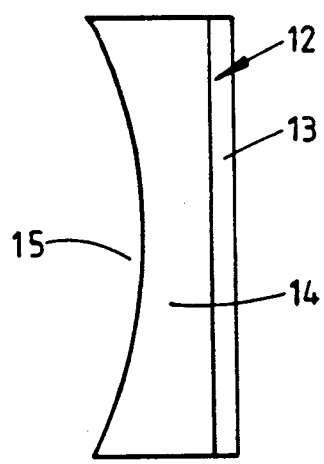
FIG. 3 is a side elevation of the cutting element at ambient temperature.

FIG. 3 shows the cutting element 12 at ambient temperature. It will be seen that the hard facing layer 13 is flat, in conventional manner, but that the rear surface 15 of the backing layer 14 is spherically concavely curved. As previously described, the concave surface 15 may be formed by a grinding process such as that commonly used in the grinding of concave lenses, appropriate grinding materials being used having regard to the nature of the material of the backing layer 14, namely cemented tungsten carbide.

However, two-layer cutting elements of the general kind described are formed by hot pressing a layer of polycrystalline diamond and a layer of powdered tungsten carbide in a press under extremely high pressure and temperature. Accordingly, it may also be possible, as an alternative, to preform the backing layer 14 with the concave surface during the forming process, rather than grinding it subsequently.

Figure 4:
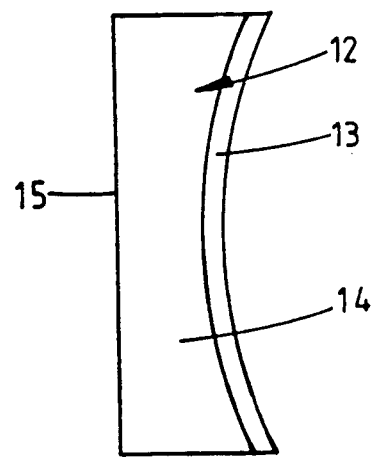
FIG. 4 is a side elevation of the cutting element at elevated temperature.

The concavity of the surface 15 is so selected that, at the elevated temperature at which bonding occurs, whether it be diffusion bonding or brazing, the differential expansion effect, due to the difference in coefficients of thermal expansion of the diamond layer and backing layer, causes the rear surface 15 to flatten, as indicated in FIG. 4 which shows the cutting element 12 at the temperature of bonding. It will be seen that, as a result of the differential expansion, the diamond layer 13 has adopted a slight concavity. (It should be appreciated that the concavities shown in FIGS. 3 and 4 are exaggerated for clarity and the actual concavities are considerably smaller).

At elevated temperature, therefore, the flattened rear surface 15 of the backing layer 14 may be readily and accurately bonded to the flat surface 11 on the stud or post 10. As previously mentioned, as the then completed cutter assembly is allowed to cool, the bond between the surfaces 15 and 11 becomes stressed, placing the bond in compression around the periphery of the cutting element, and this may increase the strength of the bond.

Although, preferably, the rear surface 15 of the cutting element is substantially flat at the bonding temperature, as shown, the invention includes within its scope arrangements where the rear surface is still slightly concave or becomes slightly convex at the bonding temperature, since such deformation will still be less than the convex deformity which would otherwise occur if the rear surface were initially flat.

Figure 5:
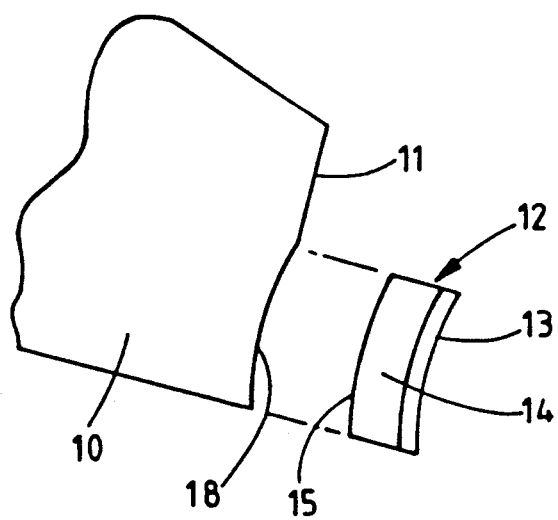
FIG. 5 is a side elevation of a stud and cutting element, at elevated temperature, according to an alternative embodiment of the invention.

FIG. 5 illustrates an alternative method according to the invention.

In the arrangement of FIG. 5, the rear surface of the cutting element is flat at ambient temperature and it is the surface 11 of the stud 10 which is initially formed with a concavity, as indicated at 18. The cutting element 12 may be of conventional configuration, i.e. a tablet of substantially constant thickness. The drawing illustrates the deformed shape of the cutting element 12 at the elevated temperature of bonding and it will be seen that, as a result of the differential expansion effect, the rear surface 15 of the backing layer 14 is convexly deformed. The initial concavity 18 on the surface 11 of the stud 10 is so selected as substantially to match the convex deformity of the surface 15 so that the two surfaces may be bonded together accurately, by diffusion bonding, brazing or other method.

Figure 6:
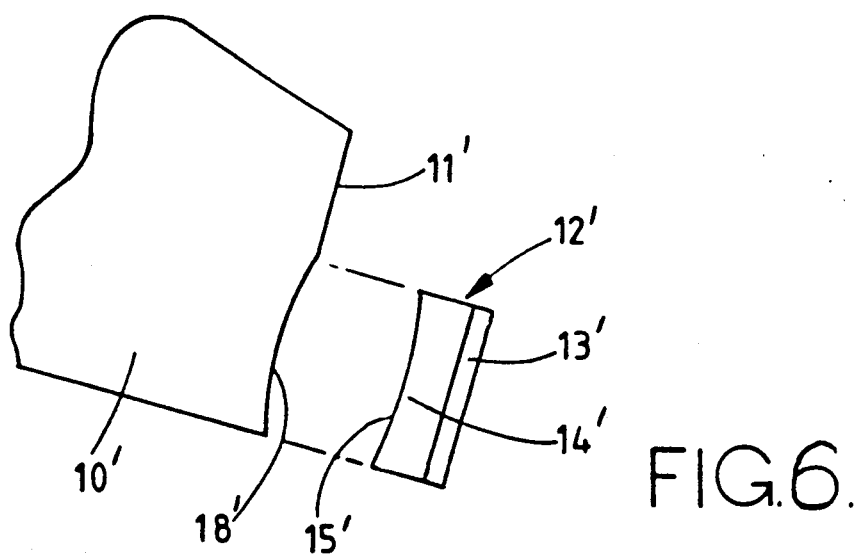
FIG. 6 is a view similar to FIG. 5 of another alternate embodiment but prior to heating.

It will be appreciated that the two methods described may be combined as shown in FIG. 6. In this case the initial concavity of the rear surface 15' is such that it reduces but is not sufficient to eliminate the convex deformation of the surface which occurs upon heating, due to the bi-metallic effect. The remaining convexity of the surface is compensated by a corresponding smaller concavity 18' in the surface of the stud 10'.

I claim:

1. A method of manufacturing a cutter assembly for a rotary drill bit, including bonding to a carrier a cutting element which comprises a thin hard facing layer already bonded to a less hard backing layer, the backing layer having a greater coefficient of thermal expansion than the hard facing layer, the method including the step of providing the backing layer with a rear surface, for bonding to the carrier, which is concave at ambient temperature.

2. A method according to claim 1, wherein the initial concavity of the rear surface of the backing layer is so selected that the rear surface becomes substantially flat at the elevated temperature at which it is bonded to the carrier.

3. A method according to claim 1, wherein the concave surface on the backing layer is formed by a grinding operation.

4. A method according to claim 1, wherein the rear surface of the backing layer is diffusion bonded to the carrier.

5. A method of manufacturing a cutter assembly for a rotary drill bit, including bonding to a carrier a cutting element which comprises a thin hard facing layer already bonded to a less hard backing layer, the backing layer having a greater coefficient of thermal expansion than the hard facing layer, the method including the step of providing the carrier with a concave surface, and bonding the rear surface of the backing layer of the cutting element to said concave surface of the carrier, whereby said concave surface at least partly accommodates any convex deformation of the rear surface of the backing layer at the elevated temperature at which bonding is carried out.

6. A method according to claim 5, wherein the cutting element initially has a substantially flat rear surface, the convex deformation of the rear surface at said elevated temperature being accommodated partly or wholly by the concavity of the surface of the carrier.

7. A method according to claim 5, wherein the initial concavity of the surface of the carrier is selected so as substantially to match the convexity of the rear surface of the backing layer at the elevated temperature at which it is bonded to the carrier.

8. A method according to claim 5, wherein the backing layer is provided with a rear surface, for bonding to the carrier, which is concave at ambient temperature, convex deformation of the rear surface of the backing layer, at the temperature at which bonding is carried out, being partly compensated for by the initial concavity of the rear surface, and partly accommodated by the concavity of said concave surface of the carrier.

9. A method according to claim 5, wherein the concave surface on the carrier is substantially coextensive with said rear surface of the backing layer.

10. A method according to claim 5, wherein the concave surface on the carrier is formed by a grinding operation.

11. A method according to claim 5, wherein the rear surface of the backing layer is diffusion bonded to the carrier.

12. A cutter assembly for a rotary drill hit, including a carrier, and a cutting element which comprises a thin hard facing layer bonded to a less hard backing layer, the backing layer having a greater coefficient of thermal expansion than the hard facing layer, the carrier being provided with a concave surface, and the rear surface of the backing layer of the cutting element being bonded to said concave surface of the carrier.

* * * * *